(12) United States Patent
Okabe et al.

(10) Patent No.: US 12,470,154 B2
(45) Date of Patent: Nov. 11, 2025

(54) VEHICLE ON-BOARD POWER CONVERSION DEVICE AND METHOD FOR CONTROLLING VEHICLE ON-BOARD POWER CONVERSION DEVICE

(71) Applicant: KABUSHIKI KAISHA TOYOTA JIDOSHOKKI, Aichi-ken (JP)

(72) Inventors: Kazuya Okabe, Kariya (JP); Masato Morikawa, Kariya (JP); Masahiro Ichigo, Kariya (JP); Takashi Takeuchi, Kariya (JP)

(73) Assignee: KABUSHIKI KAISHA TOYOTA JIDOSHOKKI, Aichi-ken (JP)

( * ) Notice: Subject to any disclaimer, the term of this patent is extended or adjusted under 35 U.S.C. 154(b) by 0 days.

(21) Appl. No.: 18/660,649

(22) Filed: May 10, 2024

(65) Prior Publication Data

US 2024/0405696 A1 Dec. 5, 2024

(30) Foreign Application Priority Data

Jun. 2, 2023 (JP) .................................. 2023-091763

(51) Int. Cl.
  B60R 16/03  (2006.01)
  H02M 1/00  (2007.01)
  (Continued)

(52) U.S. Cl.
  CPC .......... *H02M 7/5387* (2013.01); *B60R 16/03* (2013.01); *H02M 1/0054* (2021.05); *H02M 3/33573* (2021.05)

(58) Field of Classification Search
  None
  See application file for complete search history.

(56) References Cited

U.S. PATENT DOCUMENTS

2009/0021971 A1\* 1/2009 Korich ............... H05K 7/20927
  363/141
2023/0134237 A1\* 5/2023 Wildgruber ......... H02M 1/0074
  307/9.1

(Continued)

FOREIGN PATENT DOCUMENTS

JP  9-74666 A  3/1997
JP  2012-16197 A  1/2012

*Primary Examiner* — Rexford N Barnie
*Assistant Examiner* — Aqeel H Bukhari
(74) *Attorney, Agent, or Firm* — GREENBLUM & BERNSTEIN, P.L.C.

(57) ABSTRACT

A vehicle on-board power conversion device includes an inverter configured to convert power output from a power supply of a vehicle and processing circuitry configured to control the inverter. The inverter includes a first inverter circuit configured to convert power, output from the power supply, into single-phase two-wire alternating-current power and supply the single-phase two-wire alternating-current power to the one or more interior power supply ports, and a second inverter circuit configured to convert power, output from the power supply, into single-phase two-wire alternating-current power and supply the single-phase two-wire alternating-current power to the one or more exterior power supply ports. The processing circuitry is configured to determine whether the vehicle is traveling, and, when determining that the vehicle is traveling, stop or limit supply of power to at least one exterior power supply port of the one or more exterior power supply ports.

8 Claims, 8 Drawing Sheets

(51) Int. Cl.
*H02M 3/335* (2006.01)
*H02M 7/5387* (2007.01)

(56) References Cited

U.S. PATENT DOCUMENTS

2024/0101098 A1* 3/2024 Salter .................. B60R 16/03
2024/0181897 A1* 6/2024 Hendrickson ... B60W 60/00253

* cited by examiner

VEHICLE ON-BOARD POWER CONVERSION DEVICE AND METHOD FOR CONTROLLING VEHICLE ON-BOARD POWER CONVERSION DEVICE

CROSS-REFERENCE TO RELATED APPLICATIONS

This application is based upon and claims the benefit of priority from prior Japanese Patent Application No. 2023-091763, filed on Jun. 2, 2023, the entire contents of which are incorporated herein by reference.

BACKGROUND

1. Field

The following description relates to a vehicle on-board power conversion device and a method for controlling the vehicle on-board power conversion device.

2. Description of Related Art

Japanese Laid-Open Patent Publication No. 9-74666 discloses a technique by which direct-current power, output from a direct-current power supply installed in an automobile, is converted by an inverter into alternating-current power, and the alternating-current power is supplied to an interior power supply port. Japanese Laid-Open Patent Publication No. 2012-16197 discloses a technique by which direct-current power, output from a direct-current power supply installed in an automobile, is converted by an inverter into alternating-current power, and the alternating-current power is supplied to an exterior power supply port.

In a case in which a shared inverter is used to supply power to an interior power supply port and an exterior power supply port, when the inverter is stopped in response to an overcurrent resulting from a short circuit or the like in one of the interior power supply port and the exterior power supply port, the supply of power to the other one is also stopped. Thus, the vehicle preferably includes two inverters, specifically, an inverter for the interior power supply port and an inverter for the exterior power supply port. Further, in some cases, a device that is to receive power from the exterior power supply port does not need to be supplied with power while the vehicle is traveling. In this case, when the inverter for the exterior power supply port operates, a switching loss or a conduction loss occurs even though the device does not require power conversion.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a vehicle on-board power conversion device installed in a vehicle is provided. The vehicle includes a power supply, one or more interior power supply ports arranged inside a passenger compartment of the vehicle, and one or more exterior power supply ports arranged outside the passenger compartment of the vehicle. The vehicle on-board power conversion device includes an inverter configured to convert power output from the power supply and processing circuitry configured to control the inverter. The inverter includes a first inverter circuit configured to convert power, output from the power supply, into single-phase two-wire alternating-current power and supply the single-phase two-wire alternating-current power to the one or more interior power supply ports, and a second inverter circuit configured to convert power, output from the power supply, into single-phase two-wire alternating-current power and supply the single-phase two-wire alternating-current power to the one or more exterior power supply ports. The processing circuitry is configured to determine whether the vehicle is traveling, and when determining that the vehicle is traveling, stop or limit supply of power to at least one exterior power supply port of the one or more exterior power supply ports.

In another general aspect, a method for controlling a vehicle on-board power conversion device installed in a vehicle is provided. The vehicle includes a power supply, one or more interior power supply ports arranged inside a passenger compartment of the vehicle, and one or more exterior power supply ports arranged outside the passenger compartment of the vehicle. The vehicle on-board power conversion device includes an inverter configured to convert power output from the power supply. The inverter includes a first inverter circuit configured to convert power, output from the power supply, into single-phase two-wire alternating-current power and supply the single-phase two-wire alternating-current power to the one or more interior power supply ports, and a second inverter circuit configured to convert power, output from the power supply, into single-phase two-wire alternating-current power and supply the single-phase two-wire alternating-current power to the one or more exterior power supply ports. The method includes determining whether the vehicle is traveling, and when determining that the vehicle is traveling, stopping or limiting supply of power to at least one exterior power supply port of the one or more exterior power supply ports.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

Embodiment

A vehicle on-board power conversion device and a method for controlling the vehicle on-board power conversion device according to one embodiment will now be described with reference to the drawings.

Overall Structure

Figure 1:
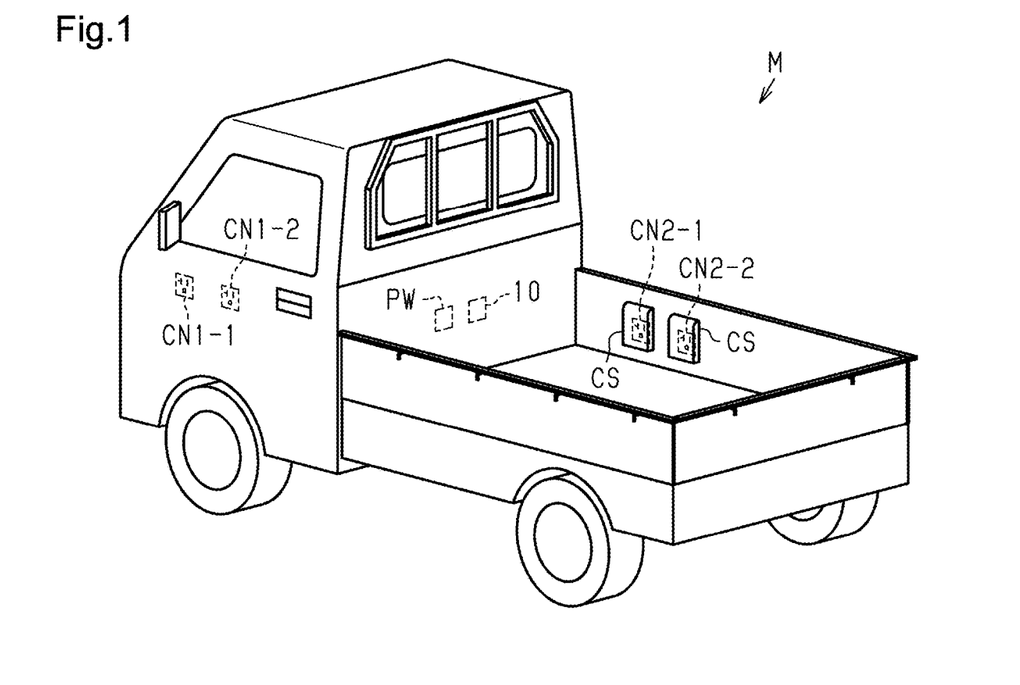
FIG. 1 is a diagram illustrating an overall structure of a vehicle according to one embodiment.

As shown in FIG. 1, a vehicle M includes a vehicle on-board power conversion device 10, a power supply PW, one or more interior power supply ports CN1, and one or more exterior power supply ports CN2. The vehicle M is a truck and includes two interior power supply ports CN1-1 and CN1-2 and two exterior power supply ports CN2-1 and CN2-2. In the following description, the interior power supply ports CN1-1 and CN1-2 will be simply referred to as the interior power supply port CN1 when not distinguished from each other, and the exterior power supply ports CN2-1 and CN2-2 will be simply referred to as the exterior power supply port CN2 when not distinguished from each other.

The interior power supply port CN1 is a single-phase two-wire outlet arranged inside the passenger compartment, for example, in the center console, the console box, the instrument panel, or the like. The exterior power supply port CN2 is a single-phase two-wire outlet arranged outside the passenger compartment, for example, in the loading platform, the trunk compartment, or the like. In general, the trunk compartment is part of the passenger compartment. However, in the present specification, because the outlet arranged in the trunk compartment is not frequently used during traveling, the outlet will be described as an example of the exterior power supply port CN2. The exterior power supply port CN2 is covered by a case CS so as to not become wet in, for example, rainfall or the like. The locations where the interior power supply port CN1 and the exterior power supply port CN2 are arranged are examples and may be changed.

The vehicle on-board power conversion device 10 is installed in the vehicle M. The vehicle on-board power conversion device 10 converts direct-current power output from the power supply PW into single-phase two-wire alternating-current power and supplies the alternating-current power to devices connected to the interior power supply port CN1 and the exterior power supply port CN2.

Figure 2:
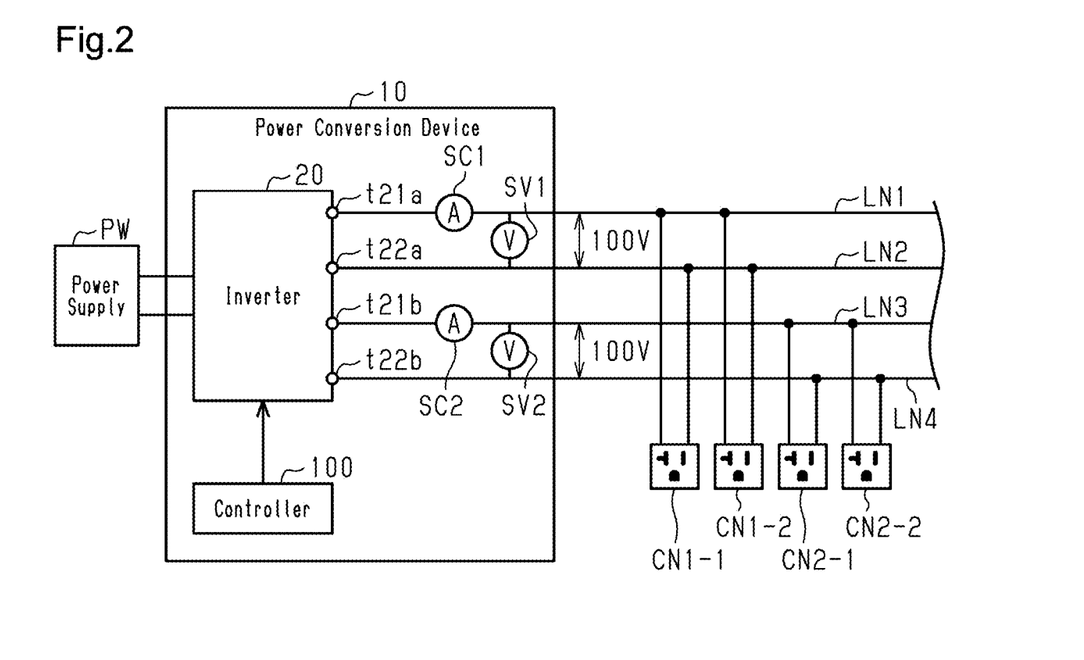
FIG. 2 is a diagram illustrating the configuration of a vehicle on-board power conversion device installed in the vehicle of FIG. 1.

As shown in FIG. 2, the vehicle on-board power conversion device 10 is connected to a first line LN1, a second line LN2, a third line LN3, and a fourth line LN4. The vehicle on-board power conversion device 10 generates single-phase two-wire alternating-current power having a voltage of 100 V between the first line LN1 and the second line LN2 and between the third line LN3 and the fourth line LN4. In the following description, the single-phase two-wire alternating-current power generated between the first line LN1 and the second line LN2 is also referred to as "first-phase alternating-current power". Further, the single-phase two-wire alternating-current power generated between the third line LN3 and the fourth line LN4 is also referred to as "second-phase alternating-current power." The interior power supply port CN1 is connected to, for example, the first line LN1 and the second line LN2 and receives supply of the first-phase alternating-current power generated between the first line LN1 and the second line LN2. The exterior power supply port CN2 is connected to, for example, the third line LN3 and the fourth line LN4 and receives supply of the second-phase alternating-current power generated between the third line LN3 and the fourth line LN4.

The first line LN1 includes a current sensor SC1, and the third line LN3 includes a current sensor SC2. A voltage sensor SV1 is arranged between the first line LN1 and the second line LN2, and a voltage sensor SV2 is arranged between the third line LN3 and the fourth line LN4. The current sensor SC1 and the voltage sensor SV1 detect the power supply state at the interior power supply port CN1 to output information indicative of the detection result to the controller 100 described later. The current sensor SC2 and the voltage sensor SV2 detect the power supply state at the exterior power supply port CN2 to output information indicative of a detection result to the controller 100.

The vehicle on-board power conversion device 10 includes an inverter 20 and a controller 100 that is processing circuitry. The configuration of the inverter 20 will be described in detail later. The controller 100 is implemented, for example, by a hardware processor such as a central processing unit (CPU) executing programs (software). Some or all of these constituent elements may be implemented by hardware (circuit unit including circuitry) such as a large scale integration (LSI), an application specific integrated circuit (ASIC), a field-programmable gate array (FPGA), or a graphics processing unit (GPU), or may be implemented by cooperation of software and hardware. The programs may be stored in advance in a storage device (not shown) including a non-transitory storage medium such as a hard disk drive (HDD) or a flash memory included in the vehicle on-board power conversion device 10. The storage device may be implemented by various storage devices described above. Alternatively, the storage device may be implemented by an electrically erasable programmable read-only memory (EEPROM), a read-only memory (ROM), a random access memory (RAM), or the like. The controller 100 controls the inverter 20 such that the inverter 20 outputs single-phase two-wire alternating-current power. Control performed by the controller 100 will be described in detail later.

Configuration of Inverter 20

Figure 3:
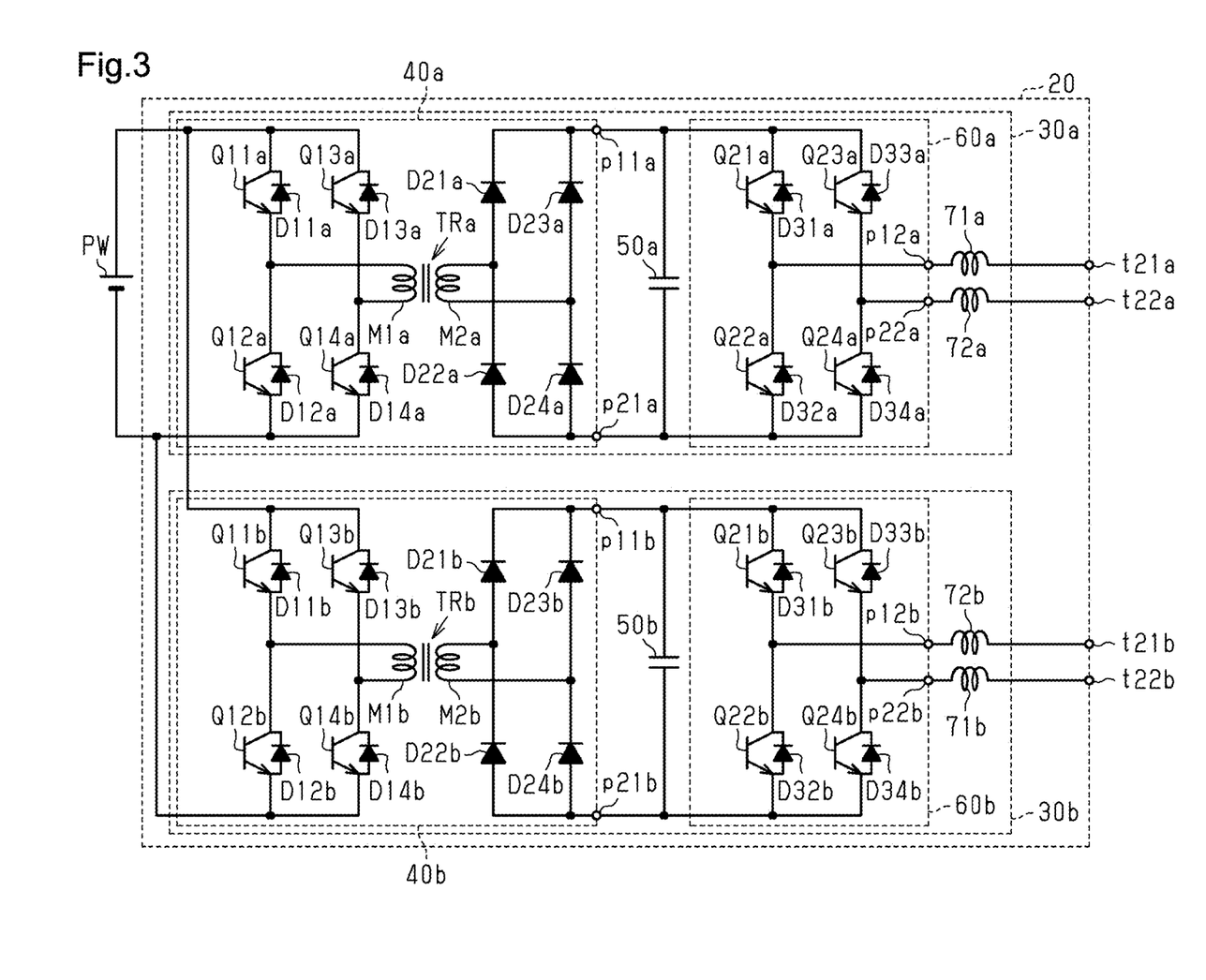
FIG. 3 is a diagram showing an example of the configuration of an inverter included in the vehicle on-board power conversion device of FIG. 2.

As shown in FIG. 3, the inverter 20 includes, for example, a first inverter circuit 30a, a second inverter circuit 30b, first terminals t21a and t21b, and second terminals t22a and t22b. The first inverter circuit 30a and the second inverter circuit 30b have the same basic configuration. In the following description, the reference numerals of components included in the first inverter circuit 30a have the suffix "a" and the reference numerals of components included in the second inverter circuit 30b have the suffix "b." In the following, the configuration of the first inverter circuit 30a will be described in detail, and the configuration of the second inverter circuit 30b will not be described. In the following description, when the components of the first inverter circuit 30a and the components of the second inverter circuit 30b are not distinguished from each other, the suffixes "a" and "b" of the reference numerals will be omitted. The first inverter circuit 30a and the second inverter circuit 30b will be simply referred to as the inverter circuit 30 when not distinguished from each other. The first inverter circuit 30a and the second inverter circuit 30b are controlled by the controller 100 to operate independently of each other.

The first inverter circuit 30a includes, for example, an isolated DC/DC converter unit 40a, a smoothing capacitor 50a, a full-bridge inverter unit 60a, and output inductors 71a and 72a.

The isolated DC/DC converter unit 40a includes a switching element Q11a, a switching element Q12a, a switching element Q13a, a switching element Q14a, a freewheeling diode D11a, a freewheeling diode D12a, a freewheeling diode D13a, a freewheeling diode D14a, an isolated transformer TRa, a diode D21a, a diode D22a, a diode D23a, a diode D24a, a first output terminal p11a, and a second output terminal p21a. The isolated transformer TRa includes a primary-side coil M1a and a secondary-side coil M2a. In the isolated transformer TRa, the primary-side coil M1a and the secondary-side coil M2a are isolated from each other.

The switching elements Q11a to Q14a and the freewheeling diodes D11a to D14a are implemented by, for example, power switching elements such as insulated gate bipolar transistors (IGBTs). The switching elements Q11a to Q14a are respectively connected to the freewheeling diodes D11a to D14a. Specifically, the switching element Q11a is connected to the freewheeling diode D11a, the switching element Q12a is connected to the freewheeling diode D12a, the switching element Q13a is connected to the freewheeling diode D13a, and the switching element Q14a is connected to the freewheeling diode D14a. The cathodes of the freewheeling diodes D11a to D14a are connected to the collectors of the corresponding switching elements Q11a to Q14a, and the anodes of the freewheeling diodes D11a to D14a are connected to the emitters of the corresponding switching elements Q11a to Q14a.

The switching elements Q11a and Q12a are connected in series to each other by a connection wire. The connection wire is connected to one end of the primary-side coil M1a. The switching elements Q13a and Q14a are connected in series to each other by a connection wire. The connection wire is connected to the other end of the primary-side coil M1a. The collectors of the switching elements Q11a and Q13a are connected to the positive terminal of the power supply PW on the high-voltage side. The emitters of the switching elements Q12a and Q14a are connected to the negative terminal of the power supply PW on the low-voltage side. Thus, the switching elements Q11a to Q14a form a full-bridge inverter.

The cathodes of the diodes D21a and D23a are connected to the first output terminal p11a. The anodes of the diodes D22a and D24a are connected to the second output terminal p21a. A connection wire between the anode of the diode D21a and the cathode of the diode D22a is connected to one end of the secondary-side coil M2a. A connection wire between the anode of the diode D23a and the cathode of the diode D24a is connected to the other end of the secondary-side coil M2a. Thus, the diodes D21a to D24a form a diode bridge and rectify alternating-current power into direct-current power.

Switching of the switching elements Q11a to Q14a of the isolated DC/DC converter unit 40a is controlled based on control by the controller 100. This allows the isolated DC/DC converter unit 40a to convert direct-current power, output from the power supply PW, and generate the converted direct-current power between the first output terminal p11a and the second output terminal p21a.

One end of the smoothing capacitor 50a is connected to the first output terminal p11a, and the other end is connected to the second output terminal p21a. The smoothing capacitor 50a smooths the direct-current power converted by the isolated DC/DC converter unit 40a.

The full-bridge inverter unit 60a includes a switching element Q21a, a switching element Q22a, a switching element Q23a, a switching element Q24a, a freewheeling diode D31a, a freewheeling diode D32a, a freewheeling diode D33a, a freewheeling diode D34a, a first output terminal p12a, and a second output terminal p22a.

The switching elements Q21a to Q24a and the freewheeling diodes D31a to D34a are implemented by, for example, power switching elements such as IGBTs. The switching elements Q21a to Q24a are respectively connected to the freewheeling diodes D31a to D34a. Specifically, the switching element Q21a is connected to the freewheeling diode D31a, the switching element Q22a is connected to the freewheeling diode D32a, the switching element Q23a is connected to the freewheeling diode D33a, and the switching element Q24a is connected to the freewheeling diode D34a. The cathodes of the freewheeling diodes D31a to D34a are connected to the collectors of the corresponding switching elements Q21a to Q24a, and the anodes of the freewheeling diodes D31a to D34a are connected to the emitters of the corresponding switching elements Q21a to Q24a.

The switching elements Q21a and Q22a are connected in series to each other by a connection wire. The switching elements Q23a and Q24a are connected in series to each other by a connection wire. The collectors of the switching elements Q21a and Q23a are connected to the first output terminal p11a and one end of the smoothing capacitor 50a. The emitters of the switching elements Q22a and Q24a are connected to the second output terminal p21a and the other end of the smoothing capacitor 50a.

The connection wire that connects the switching element Q21a and the switching element Q22a is connected to the first output terminal p12a of the full-bridge inverter unit 60a. The connection wire that connects the switching element Q23a and the switching element Q24a is connected to the second output terminal p22a of the full-bridge inverter unit 60a. Thus, the switching elements Q21a to Q24a form a full-bridge inverter.

Switching of the switching elements Q21a to Q24a of the full-bridge inverter unit 60a is controlled based on control by the controller 100. This allows the full-bridge inverter unit 60a to convert direct-current power, generated between the two ends of the smoothing capacitor 50a, and generate the converted alternating-current power between the first output terminal p12a and the second output terminal p22a.

The first output terminal p12a of the full-bridge inverter unit 60a is connected to one end of the output inductor 71a, and the other end of the output inductor 71a is connected to the first terminal t21a. The second output terminal p22a of the full-bridge inverter unit 60a is connected to one end of the output inductor 72a, and the other end of the output inductor 72a is connected to the second terminal t22a.

The first terminal t21a is connected to the first line LN1, and the second terminal t22a is connected to the second line LN2. This allows the output inductors 71a and 72a to adjust the waveform of alternating-current power output from the full-bridge inverter unit 60a to approximate an ideal sinusoidal waveform. Further, the first terminal t21b is connected to the third line LN3, and the second terminal t22b is connected to the fourth line LN4. This allows the output inductors 71b and 72b to adjust the waveform of alternating-current power output from the full-bridge inverter unit 60b to approximate an ideal sinusoidal waveform. In other words, the full-bridge inverter unit 60a generates the first-phase alternating-current power between the first output terminal p12a and the second output terminal p22a. Further, the full-bridge inverter unit 60b generates the second-phase alternating-current power between the first output terminal p12b and the second output terminal p22b.

Control by Controller 100

Control performed by the controller 100 will now be described in detail. When determining that the vehicle M is traveling based on traveling state information about the vehicle M, the controller 100 stops or limits the supply of power to at least one of the exterior power supply ports CN2. In the following embodiment, the controller 100 stops the supply of power to all of the exterior power supply ports CN2 when determining that the vehicle M is traveling.

Figure 4:
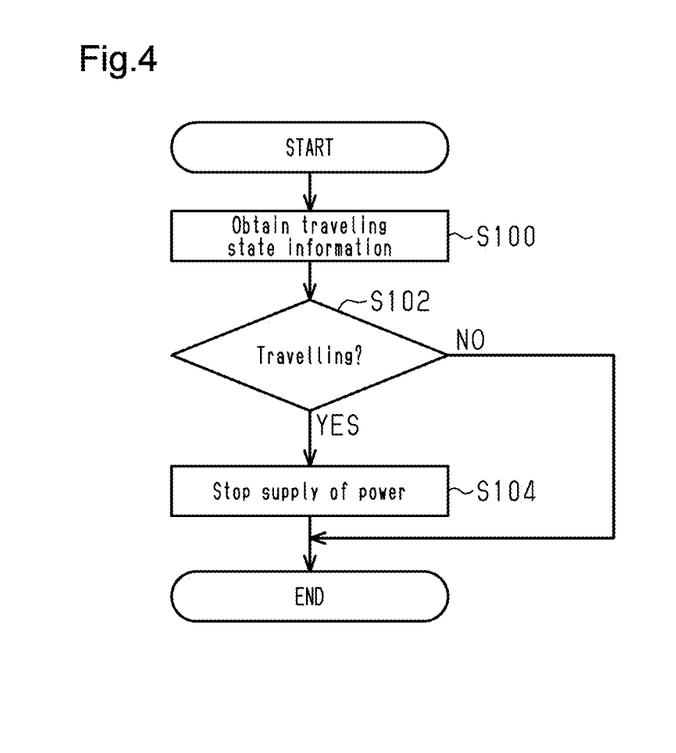
FIG. 4 is a flowchart showing an example of a process of a controller included in the vehicle on-board power conversion device of FIG. 2.

As shown in FIG. 4, the controller 100 obtains the traveling state information (step S100). The controller 100 obtains, for example, information indicative of a detection result of a speed sensor included in the vehicle M as the traveling state information. The controller 100 determines whether the vehicle M is traveling based on the obtained traveling state information (step S102). For example, the controller 100 determines that the vehicle M is in a traveling state when the speed of the vehicle M, detected by the speed sensor, is greater than or equal to a predetermined speed. The controller 100 determines that the vehicle M is in a stopped state when the speed of the vehicle M, detected by the speed sensor, is less than the predetermined speed. The predetermined speed is, for example, several km/h.

When determining that the vehicle M is not traveling, the controller 100 ends the process without stopping the supply of power to the exterior power supply port CN2. When determining that the vehicle M is traveling, the controller 100 stops the supply of power to the exterior power supply port CN2 (step S104). The controller 100 stops the power supply to the exterior power supply port CN2 by, for example, stopping switching control of the switching elements Q11b to Q14b included in the isolated DC/DC converter unit 40b.

Operation of Embodiment

In the vehicle on-board power conversion device 10, since the first inverter circuit 30a and the second inverter circuit 30b operate independently of each other, even when one of the first inverter circuit 30a and the second inverter circuit 30b is stopped, a power supply from the other one is maintained.

Advantages of Embodiment

The above-described embodiment has the following advantages.

The vehicle on-board power conversion device 10 includes the inverter 20 that converts power, output from a power supply PW, and a controller 100 that controls the inverter 20. The inverter 20 includes the first inverter circuit 30a that converts power, output from the power supply PW, into single-phase two-wire alternating-current power and supplies the single-phase two-wire alternating-current power to one or more interior power supply ports CN1, and the second inverter circuit 30b that converts power, output from the power supply PW, into single-phase two-wire alternating-current power and supplies the single-phase two-wire alternating-current power to one or more exterior power supply ports CN2. The controller 100 determines whether the vehicle M is traveling based on the traveling state information about the vehicle M. When determining that the vehicle M is traveling, the controller 100 stops the supply of power to at least one of the exterior power supply ports CN2.

With this configuration, the inverter 20 has redundancy by including two inverters, specifically, the first inverter circuit 30a that supplies the first-phase alternating-current power and the second inverter circuit 30b that supplies the second-phase alternating-current power. Thus, the vehicle on-board power conversion device 10 maintains the power supply of the first inverter circuit 30a even when, for example, stopping the second inverter circuit 30b. In addition, the vehicle on-board power conversion device 10 stops the isolated DC/DC converter unit 40b based on the traveling state of the vehicle M. This avoids a switching loss, occurring in switching control of the switching elements Q11b to Q14b, and a conduction loss, occurring in the isolated DC/DC converter unit 40b.

Modifications

The present embodiment may be modified as follows. The present embodiment and the following modifications can be combined as long as the combined modifications remain technically consistent with each other. In the following description of modifications, like or the same reference numerals are given to those components that are like or the same as the corresponding components in the above-described embodiment and such components will not be described.

In the above-described embodiment, the controller 100 stops the supply of power to the exterior power supply port CN2 based on the traveling state of the vehicle M. In the following modification, the controller 100 stops the supply of power to the exterior power supply port CN2 based on whether power is supplied to a load connected to the exterior power supply port CN2.

Figure 5:
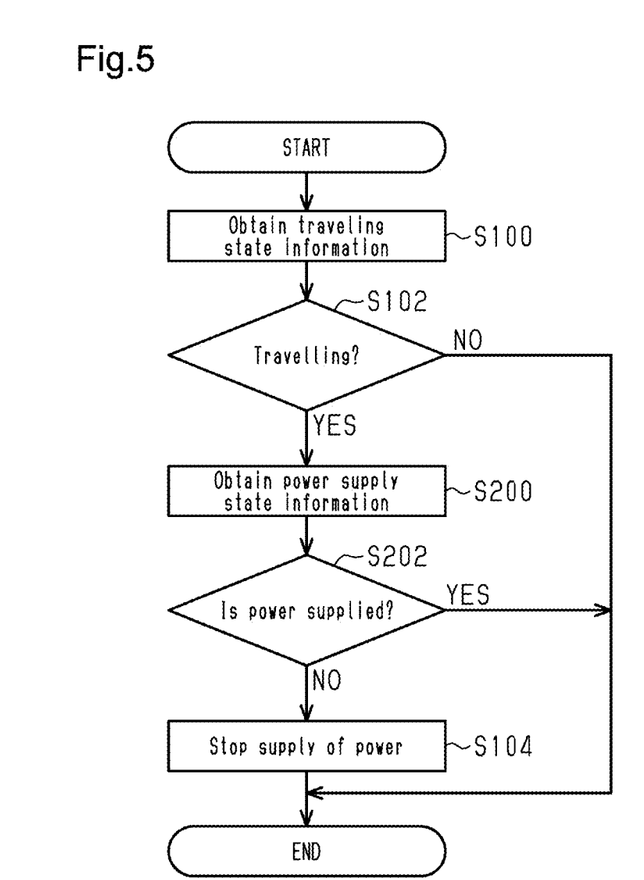
FIG. 5 is a flowchart showing an example of a process of the controller included in the vehicle on-board power conversion device in a modification.

In one example shown in FIG. 5, processes in steps S200 and S202 are performed between steps S102 and S104 shown in FIG. 4. When determining that the vehicle M is traveling, the controller 100 obtains power supply state information (step S200). The controller 100 obtains, as the power supply state information, for example, information indicative of detection results output from the current sensors SC1 and SC2 and the voltage sensors SV1 and SV2.

The controller 100 determines whether power is supplied from the second inverter circuit 30b to a load, connected to the exterior power supply port CN2, based on the obtained power supply state information (step S202). For example, when the power supply state information indicates that power is supplied to the load connected to the exterior power supply port CN2, the controller 100 determines that the power is supplied from the second inverter circuit 30b.

When the power supply state information indicates that power is not supplied to the load connected to the exterior power supply port CN2, the controller 100 determines that the power is not supplied from the second inverter circuit 30b.

When determining that power is supplied from the second inverter circuit 30b to the load, the controller 100 ends the process without stopping or limiting the supply of power to the exterior power supply port CN2. Thus, the controller 100 maintains the supply of power to the load connected to the exterior power supply port CN2 although the vehicle M is traveling. When determining that power is not supplied from the second inverter circuit 30b to the load, the controller 100 proceeds to step S104 and stops the supply of power to the exterior power supply port CN2.

In the modification, when determining that power is supplied to the load, the controller 100 maintains the supply of power to the exterior power supply port CN2. In some cases, it is preferred that the supply of power to the load connected to the exterior power supply port CN2 be maintained although the vehicle M is traveling. One of such cases where the supply of power is preferably maintained is, for example, when the load is charged with the second-phase alternating-current power output from the second inverter circuit 30b. With this configuration in the modification, when the power is supplied to the exterior power supply port CN2 although the vehicle M is traveling, the vehicle on-board power conversion device 10 maintains the supply.

In the following modification, the controller 100 limits the supply of power to the exterior power supply port CN2 based on the magnitude of power supplied to the load connected to the exterior power supply port CN2.

Figure 6:
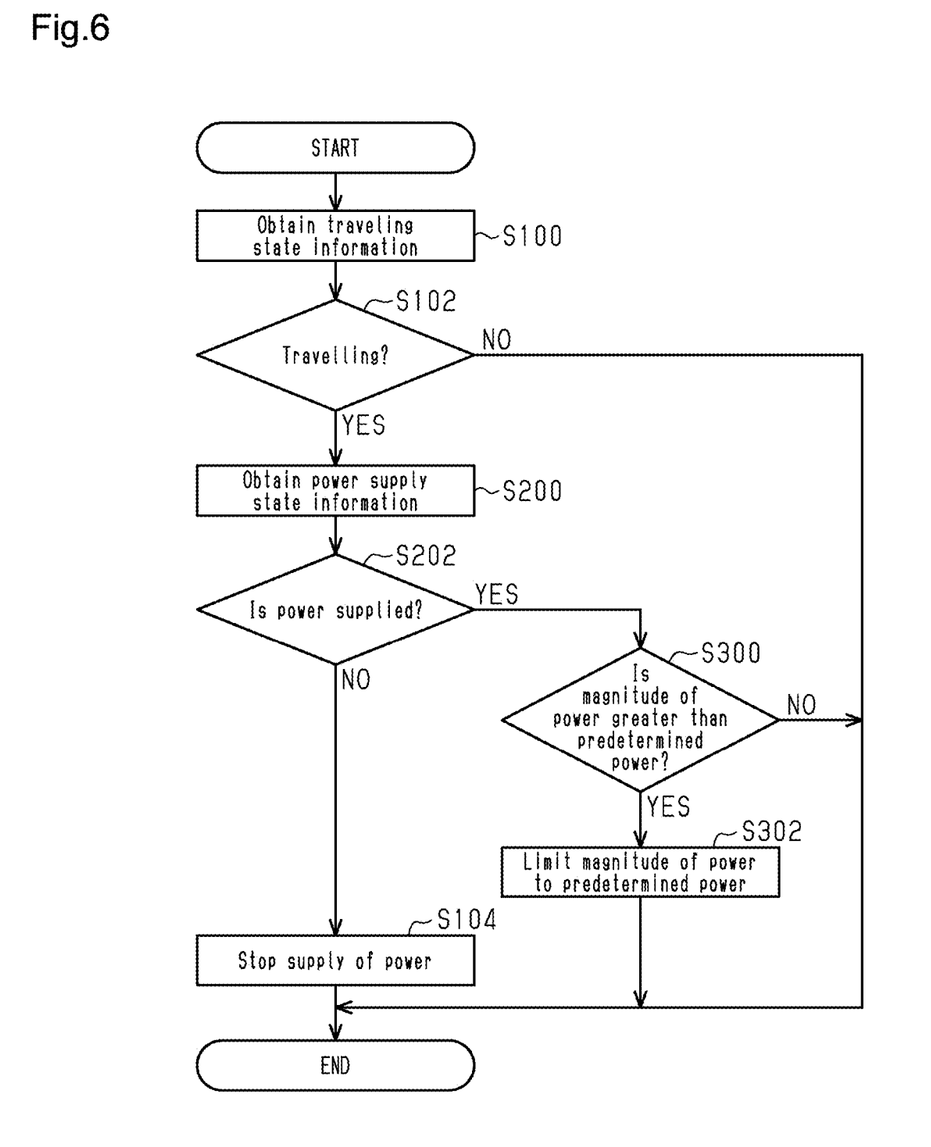
FIG. 6 is a flowchart showing an example of a process of the controller included in the vehicle on-board power conversion device in another modification.

In one example shown in FIG. 6, processes in steps S300 and S302 are performed between steps S202 and S104 shown in FIG. 5. When determining that power is supplied from the second inverter circuit 30b to the load, the controller 100 determines whether the magnitude of the power supplied to the load is greater than a predetermined power based on the power supply state information (step S300). The predetermined power ranges, for example, from several W to tens of W. When determining that the magnitude of the power, supplied from the second inverter circuit 30b to the load, is greater than the predetermined power, the controller 100 limits the magnitude of the power, supplied from the second inverter circuit 30b to the load, to the predetermined power (step S302). The controller 100 limits the magnitude of the power to the predetermined power, for example, by reducing the ON duty ratio of the switching elements Q11b to Q14b of the isolated DC/DC converter unit 40b. When determining that the magnitude of the power, supplied from the second inverter circuit 30b to the load, is less than or equal to the predetermined power, the controller 100 ends the process without limiting the supply of power to the exterior power supply port CN2.

Thus, the controller 100 limits the supply of power to the exterior power supply port CN2 in accordance with the magnitude of the power supplied to the load. Specifically, when the magnitude of the power, supplied from the second inverter circuit 30b to the load, is less than or equal to the predetermined power, the controller 100 maintains the supply of power to the exterior power supply port CN2 without limitation. Further, when the magnitude of the power, supplied from the second inverter circuit 30b to the load, is greater than the predetermined power, the controller 100 limits the power output from the exterior power supply port CN2 to the predetermined power.

As described above, in some cases, it is preferred that the supply of power to the load connected to the exterior power supply port CN2 be maintained although the vehicle M is traveling. In other cases, it is desired that power be preferentially allocated to energy for driving the vehicle and the supply of power to the load connected to the exterior power supply port CN2 be limited. With this configuration in the modification, when power is supplied to the exterior power supply port CN2 while the vehicle M is traveling, the supply of power is maintained without exceeding the predetermined power. This avoids electrical failure of a device that uses power greater than the predetermined power while the vehicle M is traveling.

In place of (or in addition to) the process of limiting the magnitude of the power, supplied from the second inverter circuit 30b to the load, to the predetermined power based on whether the magnitude of the power indicated by the power supply state information is greater than the predetermined power, the controller 100 may determine the magnitude of the power, supplied from the second inverter circuit 30b, in accordance with the magnitude of the power indicated by the power supply state information. In this case, the controller 100 may increase the limitation on the magnitude of the power, supplied from the second inverter circuit 30b to the load, as the magnitude of the power indicated by the power supply state information becomes greater.

Figure 7:
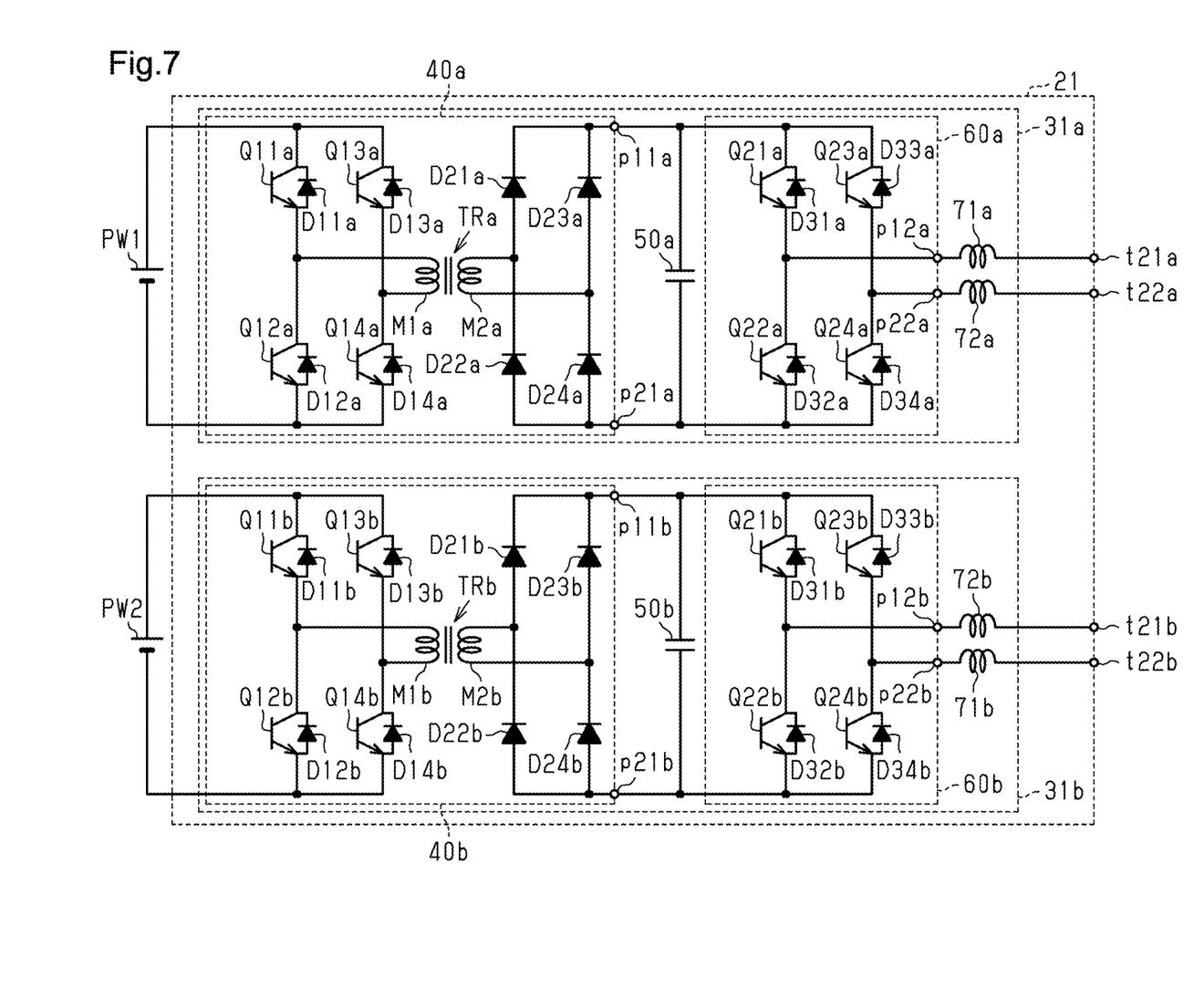
FIG. 7 is a diagram showing an example of the configuration of the inverter included in the vehicle on-board power conversion device in another modification.

Instead of converting power, output from the single power supply PW, the vehicle on-board power conversion device 10 may convert power output from a power supply PW1 for a first inverter circuit 31a and power output from a power supply PW2 for a second inverter circuit 31b. In this case, the vehicle on-board power conversion device 10 includes an inverter 21 in place of the inverter 20.

As shown in FIG. 7, the inverter 21 includes the first inverter circuit 31a and the second inverter circuit 31b. In the first inverter circuit 31a, the collectors of the switching elements Q11a and Q13a are connected to the positive terminal of the power supply PW1 on the high-voltage side. The emitters of the switching elements Q12a and Q14a are connected to the negative terminal of the power supply PW1 on the low-voltage side. In the second inverter circuit 31b, the collectors of the switching elements Q11b and Q13b are connected to the positive terminal of the power supply PW2 on the high-voltage side. The emitters of the switching elements Q12b and Q14b are connected to the negative terminal of the power supply PW2 on the low-voltage side. The other configurations of the inverter 21 are the same as those of the above-described inverter 20 and such configurations will not be described. With this configuration in the modification, the first inverter circuit 31a and the second inverter circuit 31b convert power output from the power supply PW1 and the power supply PW2 that are independent of each other. Thus, the inverter 21 is allowed to convert power output from one of the power supply PW1 and the power supply PW2 even when the other one of the power supply PW1 and the power supply PW2 is stopped due to, for example, an occurrence of abnormality. This improves redundancy.

Figure 8:
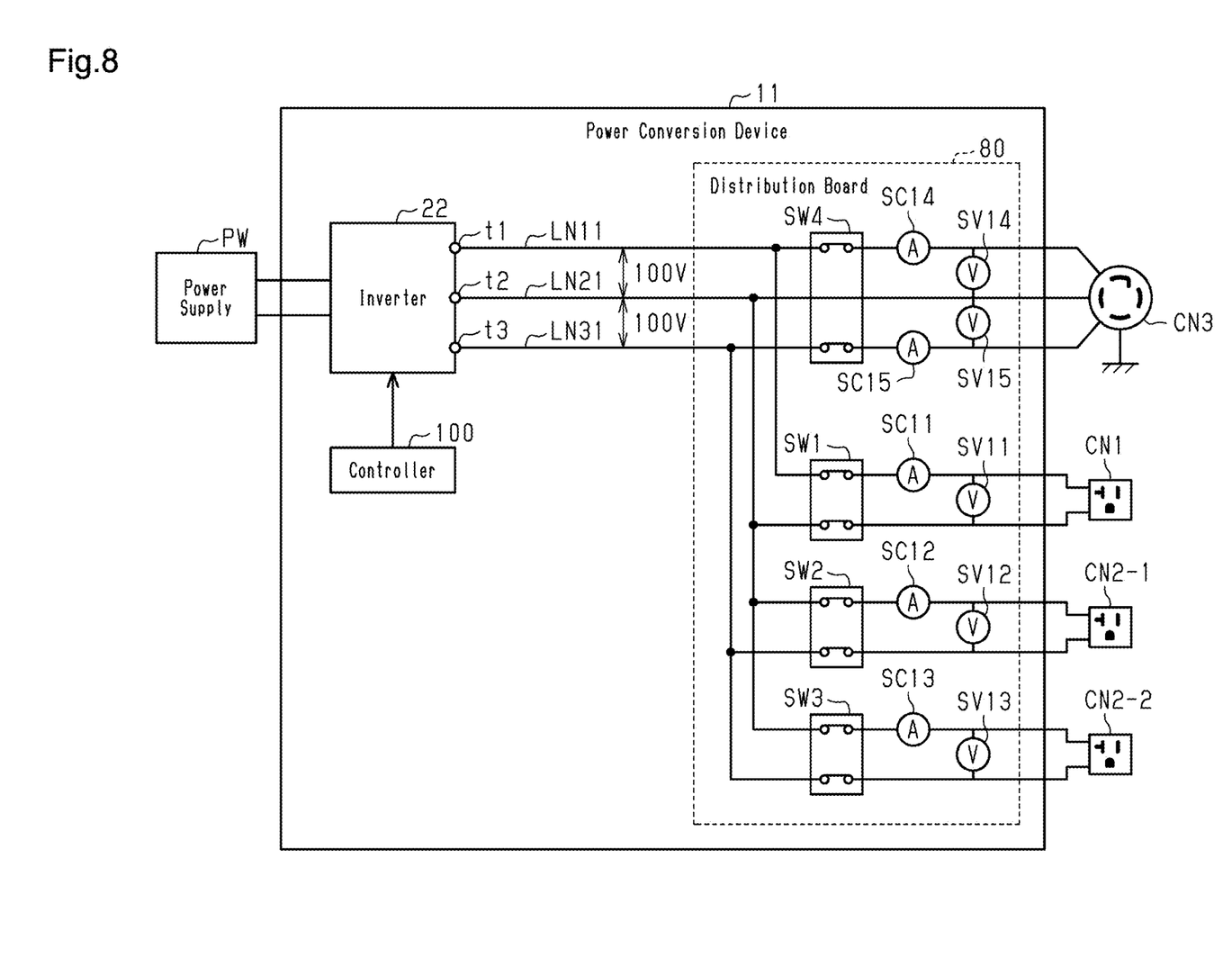
FIG. 8 is a diagram illustrating the configuration of the vehicle on-board power conversion device in another modification.

In the above-described embodiment, the controller 100 stops the power supply to the exterior power supply port CN2 by stopping switching control of the switching elements Q11b to Q14b of the isolated DC/DC converter unit 40b. In the following modification, a distribution board 80 is used to stop the power supply to the exterior power supply port CN2.

As shown in FIG. 8, the vehicle on-board power conversion device 11 of the modification includes an inverter 22, a distribution board 80, and a controller 100. The inverter 22 includes a first terminal t1, a second terminal t2, and a third terminal t3. The first terminal t1, the second terminal t2, and the third terminal t3 are respectively connected to the distribution board 80 by a first line LN11, a second line LN21, and a third line LN31. In this example, the vehicle on-board power conversion device 11 outputs single-phase three-wire alternating-current power and single-phase two-wire alternating-current power. Specifically, the inverter 22 generates single-phase two-wire alternating-current power having a voltage of 100 V between the first line LN11 and the second line LN21 and between the second line LN21 and the third line LN31. Further, the inverter 22 uses the second line LN21 as a neutral line of the single-phase three-wire system to generate single-phase three-wire alternating-current power having a voltage of 200 V between the first line LN11 and the third line LN31.

The distribution board 80 includes, for example, a first switch SW1, a second switch SW2, a third switch SW3, and a fourth switch SW4. The first switch SW1, the second switch SW2, the third switch SW3, and the fourth switch SW4 switch a connection state by opening and closing based on control by the controller 100. The first switch SW1 switches the connection state between the interior power supply port CN1 and the inverter 22. The second switch SW2 switches the connection state between the exterior power supply port CN2-1 and the inverter 22. The third switch SW3 switches the connection state between the exterior power supply port CN2-2 and the inverter 22. The fourth switch SW4 switches the connection state between a single-phase three-wire power supply port CN3 and the inverter 22. The single-phase three-wire power supply port CN3 is arranged inside the passenger compartment in the same manner as the interior power supply port CN1.

The first switch SW1 to the fourth switch SW4 are, for example, double-pole single-throw switches. One of the contacts of the first switch SW1 is arranged on the first line LN11 to switch the connection state between the first terminal t1 and the interior power supply port CN1. The other one of the contacts of the first switch SW1 is arranged on the second line LN21 to switch the connection state between the second terminal t2 and the interior power supply port CN1. One of the contacts of the second switch SW2 is arranged on the second line LN21 to switch the connection state between the second terminal t2 and the exterior power supply port CN2-1. The other one of the contacts of the second switch SW2 is arranged on the third line LN31 to switch the connection state between the third terminal t3 and the exterior power supply port CN2-1. One of the contacts of the third switch SW3 is arranged on the second line LN21 to switch the connection state between the second terminal t2 and the exterior power supply port CN2-2. The other one of the contacts of the third switch SW3 is arranged on the third line LN31 to switch the connection state between the third terminal t3 and the exterior power supply port CN2-2. One of the contacts of the fourth switch SW4 is arranged on the first line LN11 to switch the connection state between the first terminal t1 and the single-phase three-wire power supply port CN3. The other one of the contacts of the fourth switch SW4 is arranged on the third line LN31 to switch the connection state between the third terminal t3 and the single-phase three-wire power supply port CN3.

Between the first switch SW1 and the interior power supply port CN1, a current sensor SC11 is arranged on the first line LN11, and a voltage sensor SV11 is arranged between the first line LN11 and the second line LN21. The current sensor SC11 and the voltage sensor SV11 detect the power supply state at the interior power supply port CN1 to output information indicative of the detection result to the controller 100. Between the second switch SW2 and the exterior power supply port CN2-1, a current sensor SC12 is arranged on the second line LN21, and a voltage sensor SV12 is arranged between the second line LN21 and the third line LN31. The current sensor SC12 and the voltage sensor SV12 detect the power supply state at the exterior power supply port CN2-1 to output information indicative of the detection result to the controller 100. Between the third switch SW3 and the exterior power supply port CN2-2, a current sensor SC13 is arranged on the second line LN21, and a voltage sensor SV13 is arranged between the second line LN21 and the third line LN31. The current sensor SC13 and the voltage sensor SV13 detect the power supply state at the exterior power supply port CN2-2 to output information indicative of the detection result to the controller 100. Between the fourth switch SW4 and the single-phase three-wire power supply port CN3, a current sensor SC14 is arranged on the first line LN11, and a current sensor SC15 is arranged on the third line LN31. A voltage sensor SV14 is arranged between the first line LN11 and the second line LN21, and a voltage sensor SV15 is arranged between the second line LN21 and the third line LN31. The current sensors SC14 and SC15 and the voltage sensors SV14 and SV15 detect the power supply state at the single-phase three-wire power supply port CN3 to output information indicative of the detection result to the controller 100.

Figure 9:
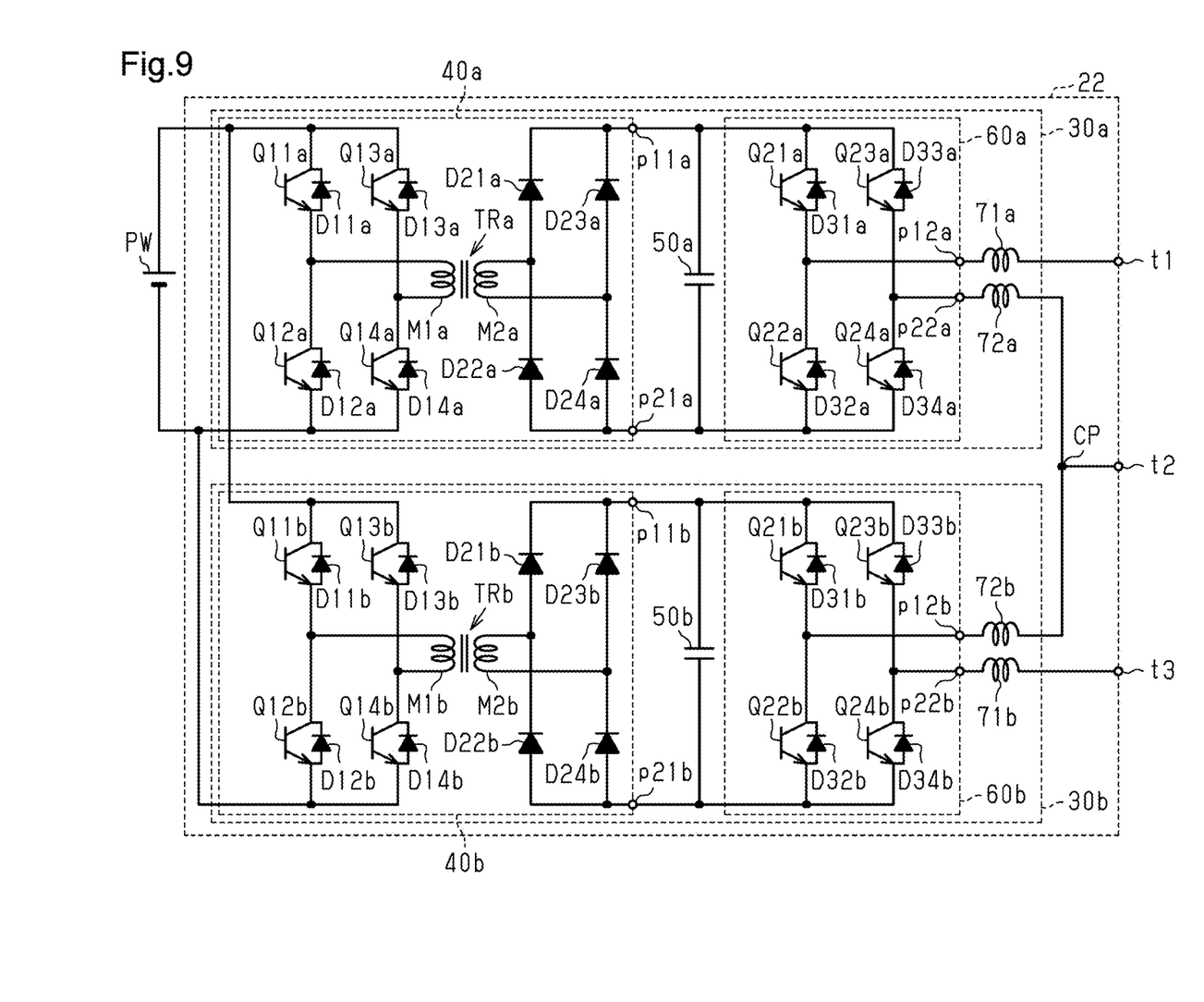
FIG. 9 is a diagram showing an example of the configuration of the inverter included in the vehicle on-board power conversion device of FIG. 8.

As shown in FIG. 9, the inverter 22 includes the first terminal t1, the second terminal t2, and the third terminal t3 in place of the first terminals t21 and the second terminals t22 of the inverter 20 and the inverter 21. The first output terminal p12a of the full-bridge inverter unit 60a is connected to one end of the output inductor 71a. The other end of the output inductor 71a is connected to the first terminal t1. The second output terminal p22a of the full-bridge inverter unit 60a is connected to one end of the output inductor 72a. The second output terminal p22b of the full-bridge inverter unit 60b is connected to one end of the output inductor 71b. The other end of the output inductor 71b is connected to the third terminal t3. The first output terminal p12b of the full-bridge inverter unit 60b is connected to one end of the output inductor 72b. The other end of the output inductor 72a and the other end of the output inductor 72b are connected to each other at a connection point CP. The connection point CP is connected to the second terminal t2. The first terminal t1 is connected to the first line LN11, the second terminal t2 is connected to the second line LN21, and the third terminal t3 is connected to the third line LN31. In other words, the second line LN21 is a neutral line in the single-phase three-wire system. The controller 100 controls the full-bridge inverter units 60a and 60b to adjust the phases of the first-phase alternating-current power and the second-phase alternating-current power. This outputs single-phase three-wire alternating-current power to the first line LN11 to the third line LN31. A control signal to the full-bridge inverter unit 60a and a control signal to the full-bridge inverter unit 60b are independent of each other.

With the above configuration, the exterior power supply ports CN2-1 and CN2-2 are supplied with single-phase two-wire alternating-current power from the second inverter circuit 30b.

In this case, instead of stopping switching control of the switching elements Q11b to Q14b in step S104, the controller 100 switches the second switch SW2 and the third switch SW3 to an open state to stop the supply of power to the exterior power supply port CN2. With this configuration, the vehicle on-board power conversion device 11 stops the supply of power to the exterior power supply port CN2 by switching connection states with the switches of the distribution board 80 based on the traveling state of the vehicle M and whether power is supplied to the load.

Instead of stopping the supply of power to the exterior power supply port CN2 in step S104, the controller 100 may limit power output such that the supply of power to the exterior power supply port CN2 is reduced compared with before determining that the vehicle M is traveling.

Instead of limiting the magnitude of power, supplied from the second inverter circuit 30b to the load, to the predetermined power in step S302, the controller 100 may stop the supply of power to the exterior power supply port CN2.

In the embodiment, the interior power supply port CN1 is connected to the first inverter circuit 30a, and the exterior power supply port CN2 is connected to the second inverter circuit 30b. Instead, the exterior power supply port CN2 may be connected to the first inverter circuit 30a, and the interior power supply port CN1 may be connected to the second inverter circuit 30b. In this case, the controller 100 stops the power supply to the exterior power supply port CN2 in step S104 by stopping switching control of the switching elements Q11a to Q14a of the isolated DC/DC converter unit 40a. Further, the controller 100 limits the magnitude of power, supplied from the first inverter circuit 30a to the load, to the predetermined power in step S302.

In the modification shown in FIG. 8, the single-phase three-wire power supply port CN3 is arranged inside the passenger compartment in the same manner as the interior power supply port CN1. Instead, the single-phase three-wire power supply port CN3 may be arranged outside the passenger compartment in the same manner as the exterior power supply port CN2. In this case, the controller 100 performs the same processes on the single-phase three-wire power supply port CN3 as those performed on the exterior power supply port CN2 in steps S104, S200, S202, S300, and S302.

In the embodiment and the modifications described above, the vehicle on-board power conversion devices 10 and 11 include multiple exterior power supply ports CN2. Instead, the vehicle on-board power conversion devices 10 and 11 may include only one exterior power supply port CN2. In the modification shown in FIG. 8, the vehicle on-board power conversion device 11 may include only the single-phase three-wire power supply port CN3. In this case, the single-phase three-wire power supply port CN3 is arranged outside the passenger compartment. Further, the vehicle on-board power conversion device 11 may include multiple interior power supply ports CN1 and multiple single-phase three-wire power supply ports CN3.

The traveling state information does not need to be a detection result of the speed sensor and may be a shift signal of the vehicle. In this case, the controller 100 may determine that the vehicle M is in a stopped state when the shift signal indicates P (parking) or N (neutral) and determine that the vehicle M is traveling when the shift signal indicates any other shift position. Further, the controller 100 may determine whether the vehicle M is in the stopped state or is traveling based on a combination of the speed and the shift signal. Specifically, the controller 100 may determine that the vehicle M is in the stopped state when the speed is less than or equal to the predetermined speed and the shift signal indicates P (parking) or N (neutral). Further, the controller 100 may determine that the vehicle M is traveling when the speed is greater than or equal to the predetermined speed and the shift signal indicates a shift position other than P (parking) and N (neutral).

In the modification shown in FIG. 8, the interior power supply port CN1 and the single-phase three-wire power supply port CN3 are connected to the inverter 22 by the distribution board 80. Instead, the interior power supply port CN1 and the single-phase three-wire power supply port CN3 may be directly connected to the terminals t1 to t3 of the inverter 22 without the distribution board 80. In this case, the wire length from the inverter 22 to the interior power supply port CN1 and the single-phase three-wire power supply port CN3 is reduced.

In a case in which multiple exterior power supply ports CN2 are arranged, the controller 100 may stop or limit the supply of power to only some of the exterior power supply ports CN2. For example, the controller 100 may stop or limit the supply of power to only the exterior power supply port CN2-2 of the exterior power supply ports CN2 without stopping or limiting the supply of power to the exterior power supply port CN2-1. When power is supplied to the exterior power supply ports CN2-1 and CN2-2 from the shared second inverter circuit 30b as in the embodiment, the distribution board 80 is used to switch the connection states between the second inverter circuit 30b and each of the exterior power supply ports CN2-1 and CN2-2.

The controller 100 may further stop switching control of the switching elements Q21b to Q24b of the full-bridge inverter unit 60b when stopping the power supply to the exterior power supply port CN2. In this case, the vehicle on-board power conversion devices 10 and 11 can further avoid a switching loss, occurring in switching control of the switching elements Q21b to Q24b, and a conduction loss, occurring in the full-bridge inverter unit 60b.

In the modification shown in FIG. 6, the controller 100 limits the magnitude of the power supplied to the load to the predetermined power by reducing the ON duty ratio of the switching elements Q11b to Q14b of the isolated DC/DC converter unit 40b. Instead, the controller 100 may limit the magnitude of the power supplied to the load to the predetermined power by reducing the ON duty ratio of the switching elements Q21b to Q24b of the full-bridge inverter unit 60b.

In the modification shown in FIG. 8, the vehicle on-board power conversion device 11 including the distribution board 80 includes the inverter 22 shown in FIG. 9. Instead, the vehicle on-board power conversion device 11 may include the inverter 20 shown in FIG. 3 or the inverter 21 shown in FIG. 7 in place of the inverter 22 shown in FIG. 9. In this case, the vehicle on-board power conversion device 11 does not need to output single-phase three-wire alternating-current power. The second line LN2 and the third line LN3 may be connected to each other at the connection point CP in the distribution board 80 to output single-phase three-wire alternating-current power.

The current sensors SC11 to SC15 and the voltage sensors SV11 to SC15 may be arranged between the inverter 22 and the first switch SW1 to the fourth switch SW4.

In the modification shown in FIG. 8, the fourth switch SW4 may be a triple-pole single-throw switch having contacts for the first line LN11, the second line LN21, and the third line LN31. Further, each of the first line LN11, the second line LN21, and the third line LN31 may include a changeover switch.

The vehicle on-board power conversion devices 10 and 11 do not need to include some or all of the output inductors 71a, 71b, 72a, and 72b as long as the parasitic inductance of the circuit wiring of the vehicle on-board power conversion devices 10 and 11 or the inductance of a device connected to the vehicle on-board power conversion device 10 adjusts the waveform of alternating-current power, output from the vehicle on-board power conversion devices 10 and 11, to approximate an ideal sinusoidal waveform.

The vehicle on-board power conversion devices 10 and 11 may include an isolated DC/DC converter unit having a configuration differing from the configurations of the isolated DC/DC converter units 40a and 40b. For example, such an isolated DC/DC converter unit may include a half bridge and a capacitor in place of the full-bridge configurations including the switching elements Q11a to Q14a and Q11b to Q14b.

The switching elements Q11a to Q14a, the switching elements Q21a to Q24a, and the switching elements Q31 to Q34 are not limited to IGBTs, and may be implemented by, for example, metal-oxide-semiconductor field-effect transistors (MOSFETs).

The vehicle on-board power conversion devices 10 and 11 may generate power other than 100 V. Further, the voltage of alternating-current power generated by the first inverter circuit 30a does not need to correspond to the voltage of alternating-current power generated by the second inverter circuit 30b. For example, power at 100 V may be generated between the first line LN1 and the second line LN2, and power at 200 V may be generated between the third line LN3 and the fourth line LN4.

Figure 10:
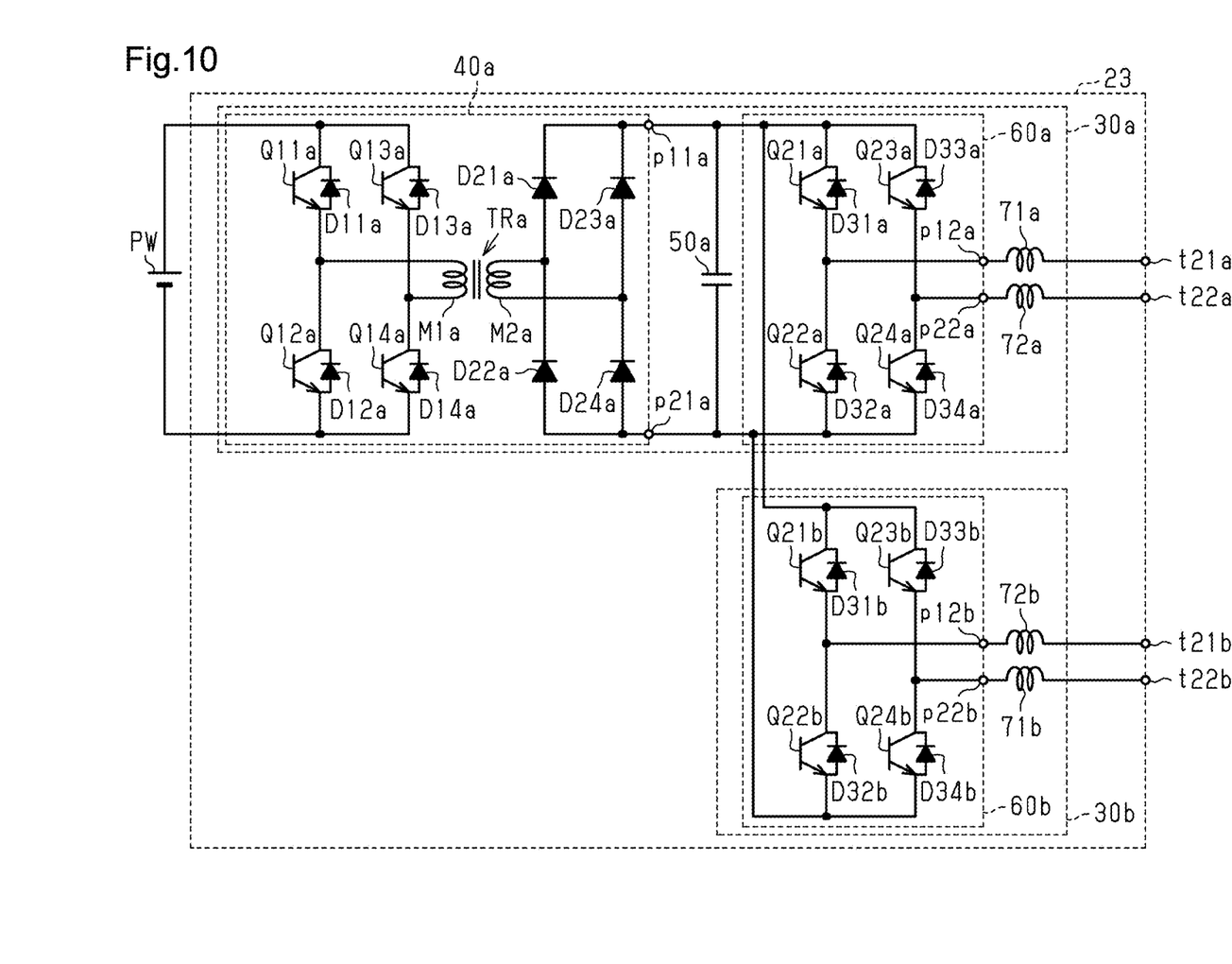
FIG. 10 is a diagram showing an example of the configuration of the inverter included in the vehicle on-board power conversion device in another modification.

The vehicle on-board power conversion devices 10 and 11 may include an inverter 23 in place of the inverter 20 and the inverter 21.

As shown in FIG. 10, the inverter 23 includes only one isolated DC/DC converter unit 40 and only one smoothing capacitor 50. In other words, the inverter 23 includes the isolated DC/DC converter unit 40a and the smoothing capacitor 50a and does not include the isolated DC/DC converter unit 40b or the smoothing capacitor 50b. In this case, the collectors of the switching elements Q21b and Q23b are connected to the first output terminal p11a and one end of the smoothing capacitor 50a. The emitters of the switching elements Q22b and Q24b are connected to the second output terminal p21a and the other end of the smoothing capacitor 50a. Thus, the full-bridge inverter units 60a and 60b are connected in parallel to the single isolated DC/DC converter 40a and the single smoothing capacitor 50a, providing two channels for output. With this configuration, the vehicle on-board power conversion devices 10 and 11 reduce the cost by sharing the isolated DC/DC converter unit 40a and the smoothing capacitor 50a with respect to the full-bridge inverter units 60a and 60b.

The vehicle on-board power conversion devices 10 and 11 may be configured without using at least one of the first output terminals p11a, p11b, p12a, p12b, the second output terminals p21a, p21b, p22a, p22b, the first terminals t21a, t21b, the second terminals t22a, t22b, and the first terminal t1, the second terminal t2, and third terminal t3.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A vehicle on-board power conversion device installed in a vehicle, the vehicle including a power supply, one or more interior power supply ports arranged inside a passenger compartment of the vehicle, and one or more exterior power supply ports arranged outside the passenger compartment of the vehicle, the vehicle on-board power conversion device comprising:
    an inverter configured to convert power output from the power supply; and
    processing circuitry configured to control the inverter, wherein
    the inverter includes
        a first inverter circuit configured to convert power, output from the power supply, into single-phase two-wire alternating-current power and supply the single-phase two-wire alternating-current power to the one or more interior power supply ports, and
        a second inverter circuit configured to convert power, output from the power supply, into single-phase two-wire alternating-current power and supply the single-phase two-wire alternating-current power to the one or more exterior power supply ports,
    the processing circuitry is configured to
        determine whether the vehicle is traveling, and
        when determining that the vehicle is traveling, stop or limit supply of power to at least one exterior power supply port of the one or more exterior power supply ports,
    the second inverter circuit includes a full-bridge inverter unit including switching elements, and
    the processing circuitry is further configured such that:
        when stopping the supply of power to the at least one exterior power supply port, the processing circuitry stops a switching control of the switching elements of the full-bridge inverter to set the power supplied to the at least one exterior power supply port to zero, and
        when limiting the supply of power to the at least one exterior power supply port, the processing circuitry controls the switching elements of the full-bridge inverter to set the electric power supplied to the at least one exterior power supply port to a predetermined power greater than zero.

2. The vehicle on-board power conversion device according to claim 1, further comprising a current sensor configured to detect power supply state at the exterior power supply port, wherein
    the processing circuitry is further configured to
        determine, based on a detection result of the current sensor, whether power is supplied to a load connected to the exterior power supply port,
        when determining that power is not supplied to the load, stop or limit the supply of power to the at least one exterior power supply port, and
        when determining that power is supplied to the load, maintain the supply of power to the at least one exterior power supply port.

3. The vehicle on-board power conversion device according to claim 1, further comprising a current sensor configured to detect power supply state at the exterior power supply port and a voltage sensor configured to detect power supply state at the exterior power supply port, wherein the processing circuitry is configured to
obtain, based on detection results of the current sensor and the voltage sensor, a magnitude of power supplied to a load connected to the exterior power supply port,
stop or limit the supply of power to the at least one exterior power supply port in accordance with the magnitude of power supplied to the load connected to the exterior power supply port.

4. The vehicle on-board power conversion device according to claim 2, further comprising a voltage sensor configured to detect power supply state at the exterior power supply port, wherein
the processing circuitry is further configured to
obtain, based on detection results of the current sensor and the voltage sensor, a magnitude of power supplied to a load connected to the exterior power supply port,
determine whether the magnitude of power supplied to the load is greater than a predetermined power,
when determining that the magnitude of the power supplied to the load is greater than the predetermined power, stop or limit the supply of power to the at least one exterior power supply port, and
when determining that the magnitude of the power supplied to the load is less than or equal to the predetermined power, maintain the supply of power to the at least one exterior power supply port.

5. The vehicle on-board power conversion device according to claim 1, wherein
the first inverter circuit includes an isolated DC/DC converter unit including switching elements and a full-bridge inverter unit including switching elements,
the second inverter circuit further includes an isolated DC/DC converter unit,
the power supply is a single power supply, and
the isolated DC/DC converter unit and the full-bridge inverter unit of the first inverter circuit and the isolated DC/DC converter unit and the full-bridge inverter unit of the second inverter circuit are connected in parallel to each other with respect to the power supply.

6. A method for controlling a vehicle on-board power conversion device installed in a vehicle, the vehicle including a power supply, one or more interior power supply ports arranged inside a passenger compartment of the vehicle, and one or more exterior power supply ports arranged outside the passenger compartment of the vehicle, wherein
the vehicle on-board power conversion device includes an inverter configured to convert power output from the power supply, and
the inverter includes
a first inverter circuit configured to convert power, output from the power supply, into single-phase two-wire alternating-current power and supply the single-phase two-wire alternating-current power to the one or more interior power supply ports, and
a second inverter circuit configured to convert power, output from the power supply, into single-phase two-wire alternating-current power and supply the single-phase two-wire alternating-current power to the one or more exterior power supply ports,
the second inverter circuit includes a full-bridge inverter unit including switching elements, and
the method comprising:
determining whether the vehicle is traveling;
when determining that the vehicle is traveling, stopping or limiting supply of power to at least one exterior power supply port of the one or more exterior power supply ports,
stopping the supply of power to the at least one exterior power supply port includes stopping a switching control of the switching elements of the full-bridge inverter to set the power supplied to the at least one exterior power supply port to zero, and
limiting the supply of power to the at least one exterior power supply port includes controlling the switching elements of the full-bridge inverter to set the electric power supplied to the at least one exterior power supply port to a predetermined power greater than zero.

7. The vehicle on-board power conversion device according to claim 5, wherein
the processing circuitry is further configured such that:
when stopping the supply of power to the at least one exterior power supply port, the processing circuitry stops a switching control of the switching elements of the isolated DC/DC converter unit of the second inverter circuit to set the power supplied to the at least one exterior power supply port to zero, and
when limiting the supply of power to the at least one exterior power supply port, the processing circuitry controls the switching elements of the isolated DC/DC converter unit of the second inverter circuit to set the electric power supplied to the at least one exterior power supply port to the predetermined power.

8. A vehicle on-board power conversion device installed in a vehicle, the vehicle including a power supply, one or more interior power supply ports arranged inside a passenger compartment of the vehicle, and one or more exterior power supply ports arranged outside the passenger compartment of the vehicle, the vehicle on-board power conversion device comprising:
an inverter configured to convert power output from the power supply; and
processing circuitry configured to control the inverter, wherein
the inverter includes
a first inverter circuit configured to convert power, output from the power supply, into single-phase two-wire alternating-current power and supply the single-phase two-wire alternating-current power to the one or more interior power supply ports, and
a second inverter circuit configured to convert power, output from the power supply, into single-phase two-wire alternating-current power and supply the single-phase two-wire alternating-current power to the one or more exterior power supply ports, the processing circuitry is configured to
determine whether the vehicle is traveling, and
when determining that the vehicle is traveling, limit supply of power to at least one exterior power supply port of the one or more exterior power supply ports,
the second inverter circuit includes a full-bridge inverter unit including switching elements, and
the processing circuitry is further configured such that, when limiting the supply of power to the at least one exterior power supply port, the processing circuitry controls the switching elements of the full-bridge inverter to set the electric power supplied to the at least one exterior power supply port to a predetermined power greater than zero.

* * * * *